US012573703B2

(12) United States Patent
Nemes

(10) Patent No.: US 12,573,703 B2
(45) Date of Patent: Mar. 10, 2026

(54) BATTERY MODULE, A BATTERY PACK, AN ELECTRIC VEHICLE, AND A METHOD OF MOUNTING A BATTERY MODULE

(71) Applicant: SAMSUNG SDI CO., LTD., Yongin-si (KR)

(72) Inventor: Marton Nemes, Seiersberg-Pirka (AD)

(73) Assignee: Samsung SDI Co., Ltd., Yongin-si (KR)

( * ) Notice: Subject to any disclaimer, the term of this patent is extended or adjusted under 35 U.S.C. 154(b) by 719 days.

(21) Appl. No.: 17/869,717

(22) Filed: Jul. 20, 2022

(65) Prior Publication Data

US 2023/0025711 A1     Jan. 26, 2023

(30) Foreign Application Priority Data

Jul. 23, 2021     (EP) ...................................... 21187388
Jul. 18, 2022     (KR) ......................... 10-2022-0088526

(51) Int. Cl.
*H01M 50/262* (2021.01)
*H01M 50/249* (2021.01)
(Continued)

(52) U.S. Cl.
CPC ....... *H01M 50/262* (2021.01); *H01M 50/249* (2021.01); *H01M 50/258* (2021.01); *H01M 50/543* (2021.01); *H01M 2220/20* (2013.01)

(58) Field of Classification Search
CPC ............. H01M 50/262; H01M 50/249; H01M 50/543; H01M 50/258
See application file for complete search history.

(56) References Cited

U.S. PATENT DOCUMENTS

2011/0159353 A1*   6/2011   Byun .................. H01M 50/528
                                                        429/160
2012/0082886 A1    4/2012   Oya
                         (Continued)

FOREIGN PATENT DOCUMENTS

CN          202282415 U      6/2012
CN          108666466 A     10/2018
                 (Continued)

OTHER PUBLICATIONS

Extended European Search Report issued in corresponding EP Application No. 21187388.0, dated Apr. 19, 2024, 13 pages.
(Continued)

*Primary Examiner* — Kenneth J Douyette
(74) *Attorney, Agent, or Firm* — Womble Bond Dickinson (US) LLP

(57) ABSTRACT

A battery module includes a plurality of secondary battery cells and a negative current collector. Each of the secondary battery cells includes an electrode assembly including a positive electrode, a negative electrode, and a separator interposed between the positive electrode and the negative electrode, a case accommodating the electrode assembly, a positive terminal electrically connected to the positive electrode, and a negative terminal electrically connected to the negative electrode. The case of each of the plurality of secondary battery cells has a groove that is part of the negative terminal. The negative current collector includes a negative connection portion mechanically and electrically connected with a first one of the plurality of secondary battery cells by a first press fit connection in the groove of the case.

16 Claims, 3 Drawing Sheets

(51) Int. Cl.
      *H01M 50/258*      (2021.01)
      *H01M 50/543*      (2021.01)

(56)              References Cited

U.S. PATENT DOCUMENTS

| | | | |
|---|---|---|---|
| 2013/0260611 A1 | 10/2013 | Ahn | |
| 2014/0038008 A1* | 2/2014 | Saitou | H01M 50/507 |
| | | | 429/62 |
| 2014/0205888 A1 | 7/2014 | Kim | |
| 2014/0308568 A1 | 10/2014 | Kim | |
| 2021/0159571 A1 | 5/2021 | Geshi et al. | |

FOREIGN PATENT DOCUMENTS

| | | | | |
|---|---|---|---|---|
| CN | 111937186 A | 11/2020 | | |
| EP | 2 648 243 A1 | 10/2013 | | |
| EP | 3 780 151 A1 | 2/2021 | | |
| JP | 2003-249207 A | 9/2003 | | |
| WO | WO 2013-154171 A1 | 10/2013 | | |
| WO | WO-2019194053 A1 * | 10/2019 | | H01M 10/0422 |

OTHER PUBLICATIONS

Partial European Search Report of EP 21187388.0, Feb. 3, 2022, 14 pages.
Extended European Search Report of EP 21187388.0, Apr. 14, 2022, 15 pages.
Chinese Office Action dated Sep. 26, 2025, issued in corresponding Chinese Patent Application No. 202210866826.0 (10 pages).

\* cited by examiner

BATTERY MODULE, A BATTERY PACK, AN ELECTRIC VEHICLE, AND A METHOD OF MOUNTING A BATTERY MODULE

CROSS-REFERENCE TO RELATED APPLICATION

This application claims priority to and the benefit of European Patent Application No. 21187388.0, filed in the European Patent Office on Jul. 23, 2021, and Korean Patent Application No. 10-2022-0088526, filed in the Korean Intellectual Property Office on Jul. 18, 2022, the entire content of both of which are incorporated herein by reference.

BACKGROUND

1. Field

Aspects of embodiments of the present disclosure relate to a battery module, a battery pack including the battery module, an electric vehicle including the battery pack, and to a method of mounting the battery module.

2. Description of the Related Art

Recently, vehicles for transportation of goods and peoples have been developed that use electric power as a source for motion. Such an electric vehicle is an automobile that is propelled by an electric motor using energy stored in rechargeable (or secondary) batteries. An electric vehicle may be solely powered by batteries or may be a hybrid vehicle powered by, for example, a gasoline generator. Furthermore, the vehicle may include a combination of an electric motor and a conventional combustion engine.

Generally, an electric-vehicle battery (EVB, or traction battery) is a battery used to power the propulsion of battery electric vehicles (BEVs). Electric-vehicle batteries differ from starting, lighting, and ignition batteries in that they are designed to provide power for sustained periods of time. A rechargeable (or secondary) battery differs from a primary battery in that it is designed to be repeatedly charged and discharged, while the latter provides an irreversible conversion of chemical to electrical energy. Low-capacity rechargeable batteries are used as power supply for small electronic devices, such as cellular phones, notebook computers, and camcorders, while high-capacity rechargeable batteries are used as power supply for hybrid vehicles and the like.

Generally, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case to enable charging and discharging of the battery via an electrochemical reaction of the positive electrode, the negative electrode, and the electrolyte solution. The shape of the case, such as cylindrical or rectangular, may be selected based on the battery's intended purpose. Lithium-ion (and similar lithium polymer) batteries, widely known via their use in laptops and consumer electronics, dominate the most recent group of electric vehicles in development.

Rechargeable batteries may be used as a battery module formed of a plurality of unit battery cells coupled to each other in series and/or in parallel to provide a high energy density, such as for motor driving of a hybrid vehicle. For example, the battery module may be formed by interconnecting the electrode terminals of the plurality of unit battery cells in an arrangement or configuration depending on a desired amount of power and to realize a high-power rechargeable battery.

Battery modules can be constructed in either a block design or a modular design. In the block design, each battery is coupled to a common current collector structure and a common battery management system, and the unit thereof is arranged in a housing. In the modular design, pluralities of battery cells are connected to form submodules, and several submodules are connected to form the battery module. In automotive applications, battery systems often consist of a plurality of battery modules connected to each other in series to provide a desired voltage. The battery modules may include submodules with a plurality of stacked battery cells, and each stack may include cells connected in parallel that are, in turn, connected in series (XpYs) or cells connected in series that are, in turn, connected in parallel (XsYp).

A battery pack is a set of any number of (often identical) battery modules. They may be configured in a series, parallel or a mixture of both to deliver the desired voltage, capacity, or power density. Battery packs include the individual battery modules and the interconnects, which provide electrical conductivity between them.

The mechanical integration of such a battery pack includes appropriate mechanical connections between the individual components (e.g., within battery modules and between them and a supporting structure of the vehicle). These connections should remain functional and safe throughout the average service life of the battery system. Further, installation space and interchangeability requirements must be met, especially in mobile applications. The electrical connections between individual components of the battery modules, such as between the secondary battery cells, and between them and the positive current collector structure and/or the negative current collector structure, should be reliable and exhibit low transition resistance and cost-effective mountability.

SUMMARY

Embodiments of the present disclosure overcome or reduce at least some of the drawbacks of the related art and provide a battery module that can be effectively and cost-effectively manufactured without the need for screwing, bonding, or welding to connect one or more current collector structures with one or more cells.

According to an embodiment of the present disclosure, a battery module is provided. The battery module includes: a plurality of secondary battery cells, at least one positive current collector structure, and at least one negative current collector structure. Each of the secondary battery cells includes an electrode assembly including a positive electrode, a negative electrode, and a separator interposed between the positive electrode and the negative electrode, a positive terminal electrically connected to the positive electrode, a negative terminal electrically connected to the negative electrode, and a case receiving (or accommodating) the electrode assembly. The at least one positive current collector structure interconnects (e.g., is arranged to interconnect) the positive terminals of at least two of the plurality of secondary battery cells with each other, and the at least one negative current collector structure interconnects (e.g., is arranged to interconnect) the negative terminals of at least two of the plurality of secondary battery cells with each other. The case of each of the plurality of secondary battery cells has a groove, and the groove is at least a part of the negative terminal of the secondary battery cell. The at least one negative current collector structure includes at least one negative connection portion in (e.g., projecting into) the groove of the case of at least one of the plurality of secondary battery cells to electrically connect the at least one negative current collector structure and the negative terminal of the at least one of the plurality of secondary battery cells. Embodiments of the present disclosure also provide a battery pack, an electric vehicle, and to a method of mounting a battery module.

According to embodiments of the present disclosure, the at least one negative connection portion and the groove are mechanically connected with each other by a first press fit connection. Alternatively or additionally, the positive terminal of the at least one of the plurality of secondary battery cells has a hole, and the at least one positive current collector structure includes at least one positive connection portion in (e.g., projecting into or through) the hole to electrically connect the at least one positive current collector structure and the positive terminal. The at least one positive connection portion and the hole are mechanically connected with each other by a second press fit connection.

The negative current collector structure and/or the positive current collector structure is connected to the cell by a press fit connection. A press fit connection is an interference fit, also called a friction fit. Therein, the negative connection portion and the groove, and/or the positive connection portion and the hole, are a tight fitting pair of parts that are held together by frictional forces and/or adhesive forces acting on the contact areas between the parts. A lateral measure (e.g., an area) of the cross-section of the negative connection portion is such that, when it is inserted into the groove, a force and/or torque is exerted between the negative connection portion and the groove so that the negative connection portion is held in place within the groove. Similarly, a lateral measure (e.g., an area) of the cross-section of the positive connection portion is such that, when it is inserted into the hole, a force and/or torque is exerted between the positive connection portion and the hole so that the positive connection portion is held in place within the hole. Screwing, bonding or welding are not necessary to connect one or more current collector structures and the cell due to the press fit connection(s). Because the negative connection portion is an element of the negative current collector structure and the positive connection portion is an element of the positive current collector structure, a reliable electrical connection between the negative and/or positive connection collector structure is achieved by the mechanical connection between the cell and the negative connection portion and/or positive connection portion. Thus, the manufacture of the battery module is improved by reducing the number of production steps, thereby reducing the complexity and the time of the manufacture of the battery module. Instead of screwing, bonding or welding, the parts of the press fit connection are joined together by pressing the negative connection portion into the groove or by pressing the positive connection portion into and/or through the hole.

Different from the related art in which a positive electrode of each battery cell abuts on an elastic protrusion of a positive electrode contact piece, according to embodiments of the present disclosure, the positive current collector structure and the positive terminal and, thus, the positive electrode, are connected by the positive connection portion and the hole by a second press fit connection. For example, the connection according to embodiments of the present disclosure is not provided by a unidirectional surface contact but by a fitting pair of parts that are held together by frictional forces.

According to another embodiment of the present disclosure, a battery pack includes a battery module as described above. Because the battery modules include reliable mechanical and electrical connections and can be mounted effectively, the improved connection between the cell and the one or more current collector structures improves the reliability of mechanical and electrical connections and of the efficiency of mounting of the battery pack.

According to another embodiment of the present disclosure, an electric vehicle includes a battery module as described above. Because the battery modules include reliable mechanical and electrical connections and can be mounted effectively, the improved connection between the cell and the one or more current collector structures improves the reliability of mechanical and electrical connections and of the efficiency of mounting of the electric vehicle.

According to another embodiment of the present disclosure, methods of mounting a battery module are provided.

A method of mounting a battery module according to an embodiment of the present disclosure includes providing a plurality of secondary battery cells, at least one positive current collector structure, and at least one negative current collector structure. Each of the secondary battery cells includes an electrode assembly including a positive electrode, a negative electrode, and a separator interposed between the positive electrode and the negative electrode, a positive terminal electrically connected to the positive electrode, a negative terminal electrically connected to the negative electrode, and a case receiving (or accommodating) the electrode assembly. The at least one positive current collector structure interconnects (e.g., is arranged to interconnect) the positive terminals of at least two of the plurality of secondary battery cells with each other, and the at least one negative current collector structure interconnects (e.g., is arranged to interconnect) the negative terminals of the at least two of the plurality of secondary battery cells with each other. The case of each of the plurality of secondary battery cells has a groove, and the groove is at least a part of the negative terminal. The at least one negative current collector structure includes at least one negative connection portion in (e.g., projecting into) the groove to electrically connect the at least one negative current collector structure and the negative terminal. The method further includes mechanically connecting the at least one negative connection portion and the groove with each other by pressing the at least one negative connection portion into the groove to form a first press fit connection.

A method of mounting a battery module according to another embodiment of the present disclosure includes providing a plurality of secondary battery cells, at least one positive current collector structure, and at least one negative current collector structure. Each of the secondary battery cells includes an electrode assembly including a positive electrode, a negative electrode, and a separator interposed between the positive electrode and the negative electrode, a positive terminal electrically connected to the positive electrode, a negative terminal electrically connected to the negative electrode, and a case receiving (or accommodating) the electrode assembly. The at least one positive current collector structure interconnects (e.g., is arranged to interconnect) the positive terminals of at least two of the plurality of secondary battery cells with each other, and the at least one negative current collector structure interconnects (e.g., is arranged to interconnect) the negative terminals of the at least two of the plurality of secondary battery cells with each other. The positive terminal has a hole, and the at least one positive current collector structure includes at least one positive connection portion in (e.g., projecting into) the hole to electrically connect the at least one positive current collector structure and the positive terminal. The method further includes mechanically connecting the at least one positive connection portion and the hole with each other by pressing the at least one positive connection portion into and/or through the hole to form a second press fit connection.

The methods, according to embodiments of the present disclosure, provide a press fit connection between a current collector structure and a secondary battery cell by pressing a negative connection portion into a groove and/or by pressing a positive connection portion into and/or through a hole. Both methods can be combined (e.g., can be used together) to provide a method of mounting a battery module. That is, a first press fit connection is formed by mechanically connecting the negative connection portion and the groove with each other by pressing the negative connection portion into the groove, and a second press fit connection is formed by mechanically connecting the positive connection portion and the hole with each other by pressing the positive connection portion into and/or through the hole to form a second press fit connection. Each of the methods achieves efficient mounting of a battery module with reliable mechanical and electrical connections between the cell and the negative current collector structure and/or the positive current collector structure. The combination of the methods further enhances the efficiency of mounting the battery module.

Further aspects and features of the present disclosure can be learned from the dependent claims or the following description.

In one embodiment, the groove has a base and a lateral surface. The lateral surface has a protrusion, and the protrusion is arranged to mechanically fasten the negative connection portion within the groove to further improve the reliability of the first press fit connection. In this embodiment, the protrusion (e.g., a shoulder) provides an area of decreased cross-sectional width of the groove which can, in the mounted state, improve forces exerted between the lateral surface of the groove and the negative connection portion.

In some embodiments, the at least one negative connection portion and/or the groove of each of the plurality of secondary battery cells is configured to plastically deform the at least one negative connection portion upon insertion of the at least one negative connection portion into the groove. The plastic deformation of the negative connection portion provides a reliable connection that is based on adhesion (or friction) due to contact of surfaces and/or surface sections of the negative connection portion and of the groove. This provides a reliable mechanical contact and excellent electrical contact with low contact resistance. The plastic deformation provides an irreversible first press fit connection. For example, due to the plastic deformation of the negative connection portion and/or the groove (e.g., the case), the first press fit connection cannot be released without leaving the negative connection portion in a state in which the first press fit connection cannot be realized again. Similarly, in one embodiment, the positive connection portion and the hole are mechanically connected with each other by a second press fit connection. The at least one positive connection portion and/or the hole of each of the plurality of secondary battery cells is configured to plastically deform the positive connection portion upon insertion of the positive connection portion into and/or through the hole. Additionally or alternatively, the hole (e.g., the positive terminal) can be deformed upon insertion of the positive connection portions into the hole.

In some embodiments, the case of each of the plurality of secondary battery cells has a cylindrical shape, and the groove and the negative terminal of the case are arranged along a circumference of the case. In this embodiment, the case has an axis defined by the cylindrical shape and the circumference thereof extends in a plane orthogonal to the axis and along the surface of the case. For example, in this embodiment, the groove is a circular groove. The circumferential arrangement of the groove and of the negative terminal ensures that the cells can be mounted in any orientation with respect to rotation around the axis of the case of each of the cells, which provides an effective and reliable mounting of cells without the need to orient cells about their axes. This simplifies the method of mounting such a battery module by reducing the number of method steps and reducing the complexity of the method by avoiding orientating the cells about their axes.

In some embodiments, the at least one negative current collector structure includes at least two, and in some embodiments at least four, negative connection portions per case to enhance the mechanical reliability of the connection between the current collector structure and each of the cells. Similarly, in some embodiments, the at least one positive current collector structure includes at least two positive connection portions per case.

In one embodiment, at least two negative connection portions per case are arranged on opposite lateral surface sections of the case. Thereby, the negative connection portions of the at least partially rigid negative current collector structure can improve the mechanical integration of the battery cells within the battery module.

In some embodiments, the battery module includes two negative current collector structures, and each of the negative current collector structures includes at least one negative connection portion. The plurality of secondary battery cells is arranged between the two negative current collector structures to facilitate efficient assembly of the battery module and to provide improved mechanical integration of the battery cells within the battery module.

In one embodiment, the plurality of secondary battery cells is linearly arranged, and each of the two negative current collector structures extend in parallel to the linearly arranged secondary battery cells to further improve the mechanical integration of the battery cells within the battery module. This embodiment is particularly space-saving and provides a compact battery module.

In some embodiments, the negative connection portion and/or the at least one positive connection portion includes at least two sub portions. In the mounted state, the subportions are pressed together to facilitate the first and/or second press fit connection, respectively.

In some embodiments, the negative connection portion and/or the at least one positive connection portion has an elongated shape and a non-monotonically varying cross-section to improve the press fit connection. An elongated shape indicates that the negative connection portion and/or the positive connection portion has a length and a cross-section, and the length is larger than the cross-section. The elongated shape can facilitate a press fit connection by improving how the negative connection portion projects into the groove and/or how the positive connection portion projects into the hole. The cross-section of the negative connection portion is maximal at where the negative connection portion contacts a lateral surface of the groove and smaller (or minimal) at a base of the groove and at an end distal to the base of the groove. The cross-section of the positive connection portion may be maximal at where the positive connection portion contacts the hole and smaller elsewhere. In this embodiment, the groove may include a protrusion, as described above. The non-monotonically varying cross-sectional area of the negative connection portion and the protrusion provides a synergistically improved first press fit connection.

Each of the positive terminals of the plurality of secondary battery cells has a plurality of holes, and the at least one positive current collector structure includes a plurality (e.g., a corresponding plurality) of positive connection portions to provide a reliable connection between the positive terminal and the positive current collector structure.

BRIEF DESCRIPTION OF THE DRAWINGS

Aspects and features of the present disclosure will become apparent to those of ordinary skill in the art by describing, in detail, embodiments thereof with reference to the attached drawings, in which.

DETAILED DESCRIPTION

Figure 1:
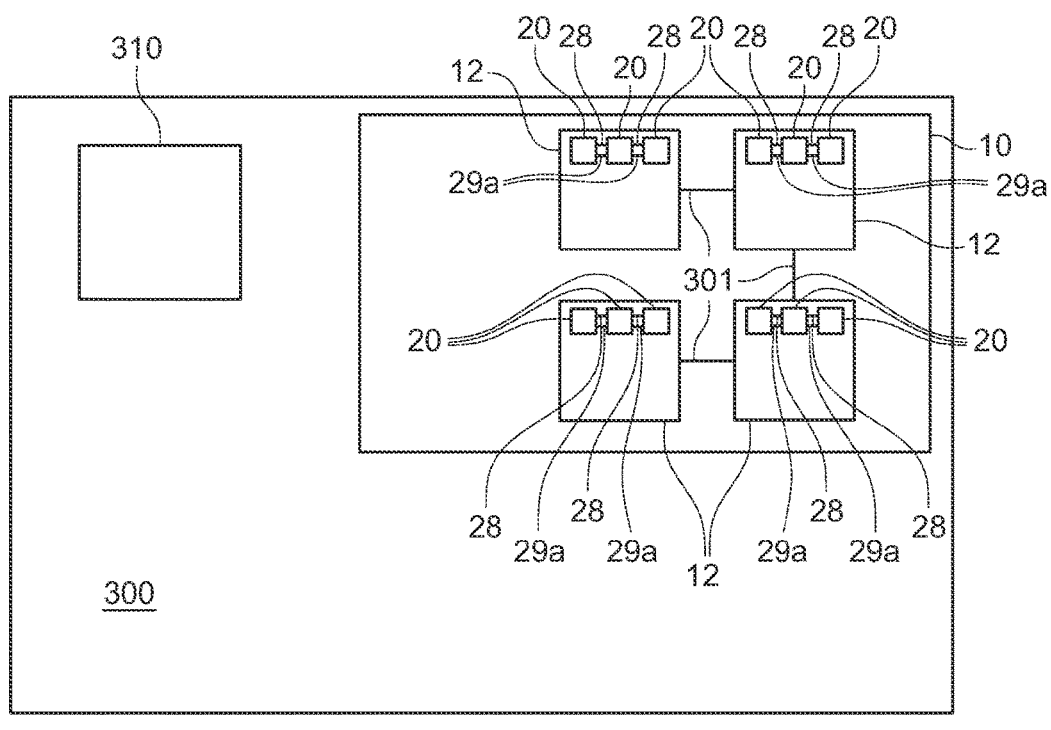
FIG. 1 is a schematic view of an electric vehicle.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

FIG. 1 is a schematic view of an electric vehicle 300. The electric vehicle 300 is propelled by an electric motor 310 using energy stored in rechargeable batteries arranged in a battery pack 10. The battery pack 10 is a set of (any number of) battery modules 12. The battery module 12 includes of a plurality of secondary (rechargeable) battery cells 20. The battery pack 10 includes the individual battery modules 12 and interconnects 301, which provide electrical conductivity between the battery modules 12. In the schematic representation of FIG. 1, each battery module 12 is illustrated as being coupled to a common positive current collector structure (e.g., a positive current collector) 28 and to a common negative current collector structure (e.g., a negative current collector) 29a (e.g., in each battery pack 10, the battery modules 12 are electrically coupled with each other by a common positive current collector structure 28 and by a common negative current collector structure 29a).

Figure 2:
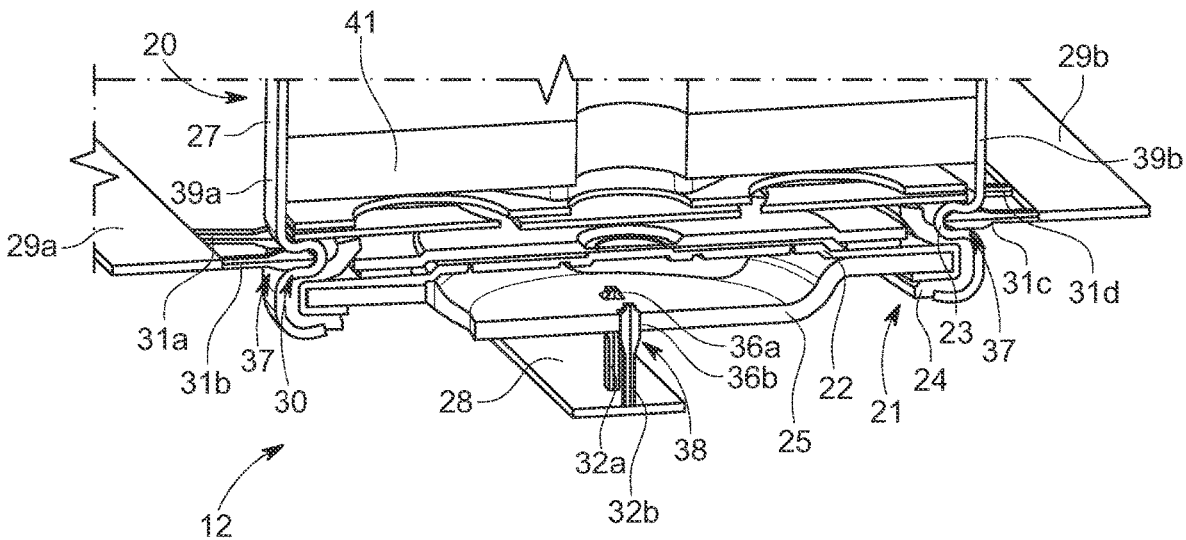
FIG. 2 is a sectional view of a battery module according an embodiment of the present disclosure.

FIG. 2 is a sectional view of a portion of the battery module 12 according an embodiment of the present disclosure. The battery module 12 includes a plurality of secondary battery cells 20, one positive current collector structure 28, and two negative current collector structures 29a, 29b. In the sectional view of FIG. 2, only one secondary battery cell 20 is shown for convenience of description.

The secondary battery cell 20 includes an electrode assembly and a spacer 41. The electrode assembly includes a positive electrode, a negative electrode, and a separator interposed between the positive electrode and the negative electrode. A negative terminal 23 is electrically connected to the negative electrode, and a cap-up is electrically connected to the positive electrode to act as a positive terminal 25. A case 27 receives (e.g., accommodates) the electrode assembly. The secondary battery cell 20 further includes a cap assembly 21 with a positive temperature coefficient fuse 22. An isolator 24 is interposed between the negative terminal 23 and the positive terminal 25.

The case 27 is the negative terminal 23. For example, the case 27 is made of a conductive material, such as metal, and the entire case 27 acts as the negative terminal 23.

The case 27 has a groove 30 (which may be referred to as called a nut or crease) arranged along the circumference (or periphery) of the case 27, and the groove 30 is a part of the negative terminal 23 (e.g., the groove 30 is part of the case 27, and thus, is part of the negative terminal 23). The case 27 has a cylindrical shape, and the groove 30 is a circular groove.

Each of the two negative current collector structures 29*a*, 29*b* interconnects the negative terminals 23 of at least two secondary battery cells 20 with each other. The two negative current collector structures 29*a*, 29*b* have four negative connection portions 31*a*, 31*b*, 31*c*, 31*d* per case 27 to interconnect the negative terminals 23 of the secondary battery cells 20. Each of the negative connection portions 31*a*, 31*b*, 31*c*, 31*d* projects into the groove 30 of the case 27 of one of the secondary battery cells 20 to electrically connect the negative current collector structures 29*a*, 29*b* and the negative terminal 23. The mechanical connection between each of the negative connection portions 31*a*, 31*b*, 31*c*, 31*d* and the groove 30 is a first press fit connection 37, described in more detail below with reference to FIG. 3).

The negative connection portions 31*a*, 31*b*, 31*c*, 31*d* are arranged pairwise (e.g., are arranged in pairs) on opposite lateral surface sections 39*a*, 39*b* of the case 27. For example, one pair of negative connection portions 31*a*, 31*b* is diametrically oppositely arranged to another pair of negative connection portions 31*c*, 31*d* (the term "diametrically" refers to the diameter of the cylindrical case 27). The plurality of secondary battery cells 20 is arranged between the two negative current collector structures 29*a*, 29*b*. The plurality of secondary battery cells 20 is linearly arranged, and each of the two negative current collector structures 29*a*, 29*b* extend in parallel to the linearly arranged secondary battery cells.

The positive current collector structure 28 interconnects the positive electrodes of at least two of the secondary battery cells 20. To interconnect the positive electrodes and the positive current collector structure 28, the positive current collector structure 28 includes two positive connection portions 32*a*, 32*b* and the positive terminal 25 has two holes (e.g., openings) 36*a*, 36*b*. In the illustrated embodiment, the holes 36*a*, 36*b* are through-holes. Each of the positive connection portions 32*a*, 32*b* projects into one of the holes 36*a*, 36*b* to electrically connect the positive current collector structure 28 and the positive electrode. In the illustrated embodiment, the positive current collector structure 28 and the positive electrode are arranged at an end face of the cylindrical case 27. Each of the positive connection portions 32*a*, 32*b* is mechanically connected with one of the holes 36*a*, 36*b* by a second press fit connection 38, described in more detailed below with reference to FIG. 4.

The negative connection portions 31*a*, 31*b*, 31*c*, 31*d* and/or the positive connection portions 32*a*, 32*b* may be referred to as press fit pins.

Figure 3:
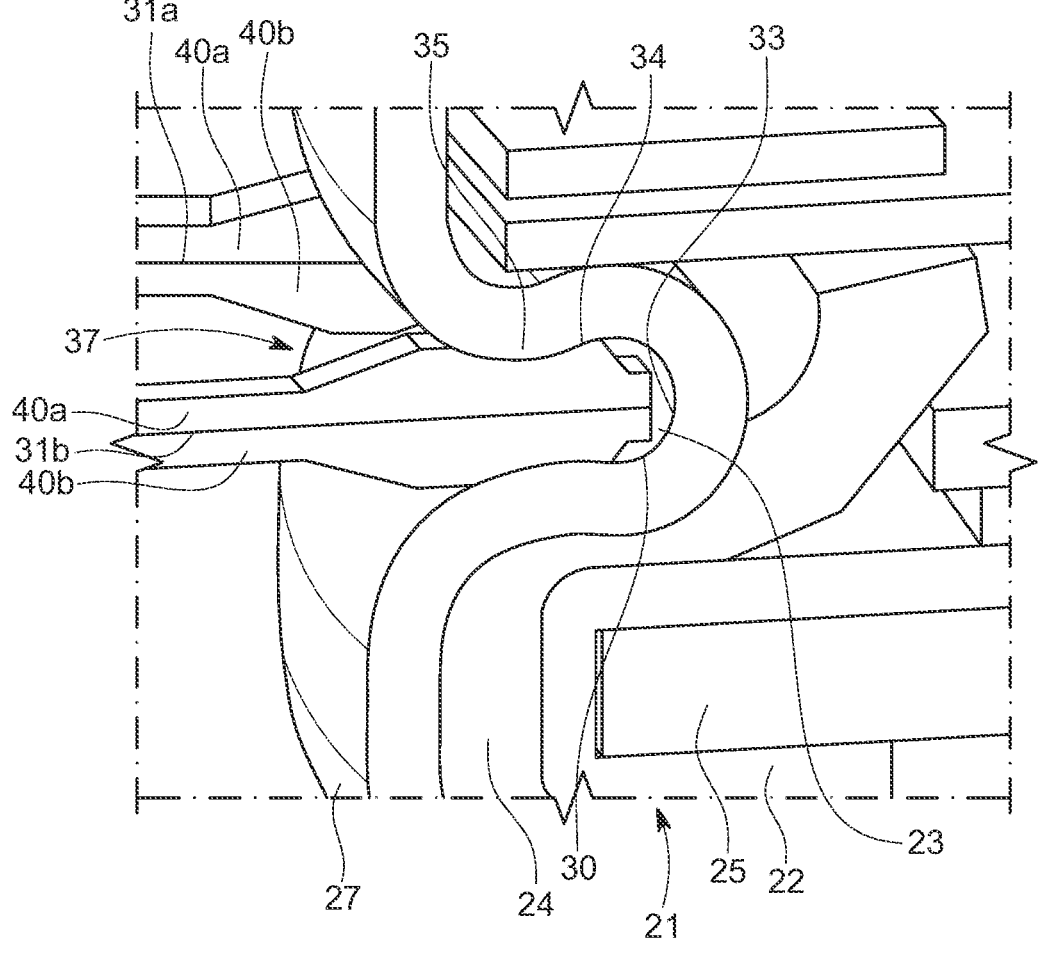
FIG. 3 is an enlarged sectional view of a portion of the battery module shown in FIG. 2.

FIG. 3 illustrates an enlarged sectional view of another portion of the battery module 12 showing the first press fit connection 37 in more detail.

The groove 30 of each secondary battery cell 20 includes a base 33 and a lateral surface 34. To improve the first press fit connection 37, the lateral surface 34 includes a protrusion 35, and the protrusion 35 mechanically fastens the negative connection portion 31*a*, 31*b*, 31*c*, 31*d* in (or within) the groove 30. The protrusion 35 reduces the cross section of the groove 30, which increases forces exerted between the negative connection portion 31*a*, 31*b*, 31*c*, 31*d* and the lateral surface 34 in the mounted state and during manufacturing of the battery module 12 when the negative connection portion 31*a*, 31*b*, 31*c*, 31*d* is pressed into the groove 30. The protrusion 35 is arranged at a lateral surface section of the lateral surface 34 distal to the base 33. For example, with reference to the cylindrical case 27, the protrusion 35 is arranged radially outwardly so that the cross section of the groove 30 changes non-monotonically from a small cross section near the base 33, to a larger cross section between the base 33 and the protrusion 35, to a smaller cross section at the protrusion 35, to a larger cross section end of the lateral surface 34 distal to the base 33. The protrusion 35 and the arrangement of the protrusion 35 within the groove 30 thereby improves the first press fit connection 37.

The negative connection portion 31*a*, 31*b*, 31*c*, 31*d* and the groove 30 are configured such that each of the negative connection portions 31*a*, 31*b*, 31*c*, 31*d* plastically deform upon insertion into the groove 30. Additionally or alternatively, the groove 30 (e.g., the case 27 that forms the groove 30) is configured to be deformed upon insertion of each of the negative connection portions 31*a*, 31*b*, 31*c*, 31*d* into the groove 30. The first press fit connection 37 is formed by pressing each of the negative connection portions 31*a*, 31*b*, 31*c*, 31*d* into the groove 30. Thereby, each of the negative connection portions 31*a*, 31*b*, 31*c*, 31*d* plastically deforms due to forces between the negative connection portions 31*a*, 31*b*, 31*c*, 31*d* and the lateral surface 34 and/or the protrusion 35. The first press fit connection 37 connects each of the negative connection portions 31*a*, 31*b*, 31*c*, 31*d* and the groove 30 reliably and irreversibly.

The cross-section of each of the negative connection portions 31*a*, 31*b*, 31*c*, 31*d* is, in some embodiments, larger than the cross section of the groove 30 perpendicular to the direction of insertion of the negative connection portion 31*a*, 31*b*, 31*c*, 31*d* to ensure that the lateral surface 34 of the groove 30 exerts sufficient forces to the negative connection portion 31*a*, 31*b*, 31*c*, 31*d* and to ensure that the first press fit connection 37 is reliably achieved.

Each of the negative connection portions 31*a*, 31*b*, 31*c*, 31*d* has two subportions 40*a*, 40*b*. In the mounted state, the subportions 40*a*, 40*b* are pressed together.

Each of the negative connection portions 31*a*, 31*b*, 31*c*, 31*d* has an elongated shape and a non-monotonically varying cross section. For example, each of the negative connection portions 31*a*, 31*b*, 31*c*, 31*d* is longer than they are thick to facilitate the first press fit connection 37. In the mounted state, each of the negative connection portions 31*a*, 31*b*, 31*c*, 31*d* has a cross-section along its elongated shape that is relatively (or comparatively) small proximal to the remainder of the negative current collector structure 29*a*, 29*b*. The cross-section then increases so that it is at its maximum when contacting the protrusion 35 and then decreases again so that it is at its minimum when contacting the base 33 of the groove 30.

Figure 4:
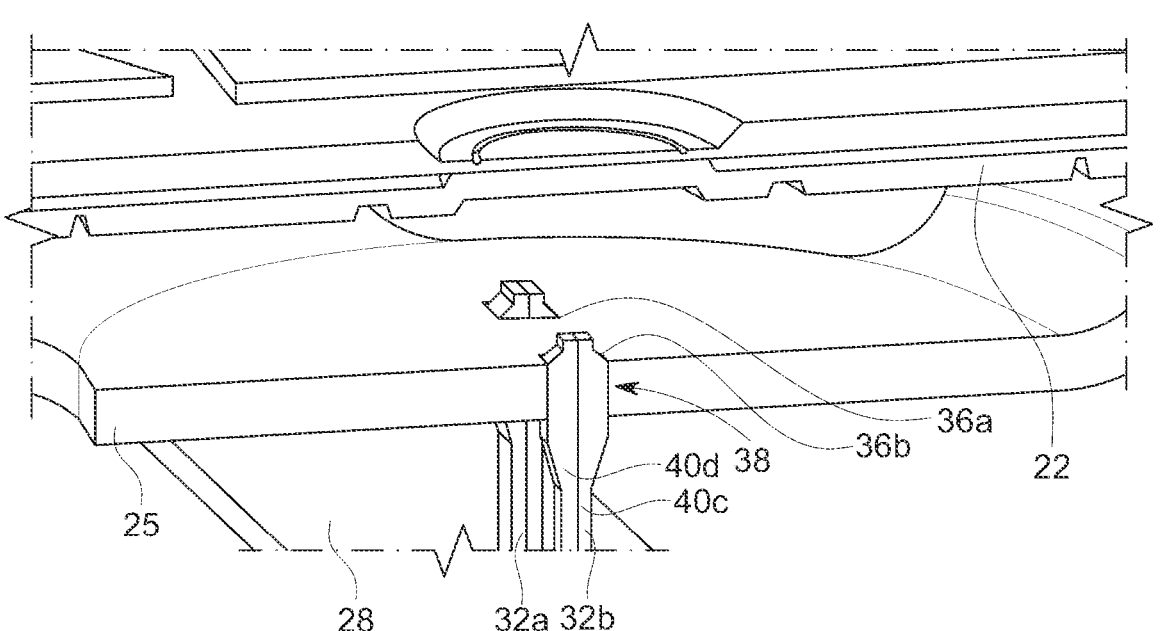
FIG. 4 is an enlarged sectional view of another portion of the battery module shown in FIG. 2.

FIG. 4 illustrates an enlarged sectional view of another portion the battery module 12.

The positive connection portion 32*a*, 32*b* and the holes 36*a*, 36*b* are configured to plastically deform each of the positive connection portions 32*a*, 32*b* upon insertion of each of the positive connection portions 32a, 32b into one of the holes 36a, 36b. Additionally or alternatively, the holes 36a, 36b (e.g., the positive electrode) are configured to be deformed upon insertion of each of the positive connection portions 31a, 31b, 31c, 31d into the holes 36a, 36b. The second press fit connection 38 is formed by pressing each of the positive connection portions 32a, 32b into one of the holes 36a, 36b. Thereby, each of the positive connection portions 32a, 32b deforms plastically due to forces between the positive connection portions 32a, 32b and the surfaces of the positive electrode that form the holes 36a, 36b. The second press fit connection 38 connects each of the positive connection portions 32a, 32b and the holes 36a, 36b reliably and irreversibly.

The cross-section of each of the positive connection portions 32a, 32b is, in some embodiments, larger than the diameter of the holes 36a, 36b and/or the cross-section of the holes 36a, 36b perpendicular to the direction of insertion of the positive connection portion 32a, 32b to ensure that the surfaces of the holes 36a, 36b exert sufficient forces to the positive connection portion 32a, 32b and to ensure that the second press fit connection 38 is reliably achieved.

Each of the positive connection portions 32a, 32b has two subportions 40c, 40d. In the mounted state, the subportions 40c, 40d are pressed together.

Each of the positive connection portions 32a, 32b has an elongated shape and a non-monotonically varying cross-section. For example, each of the positive connection portions 32a, 32b is longer than it is thick to facilitate the second press fit connection 38. In the mounted state, each of the positive connection portions 32a has a cross-section along its elongated shape such that it is relatively (or comparatively) small proximal to the remainder of the positive current collector structure 28, then increases so that it is at its maximum when contacting the surfaces of the positive electrode (e.g., the surfaces forming the holes 36a, 36b), and then decreases so that it is at its minimum when projecting (or extending) through the holes 36a, 36b.

In another embodiment, a section of the case 27 acts as the negative terminal 23. For example, the section of the case 27 that includes the groove 30, the groove 30, and/or a part of the groove 30, such as the lateral surface 34 and/or the base 33, can be configured as the negative terminal 23. This can further ensure that the negative connection portions 31a, 31b, 31c, 31d are reliably connected to the negative terminal 23 while the remainder of the case 27 may be electrically isolated (or neutral).

In another embodiment, the holes 36a, 36b may be blind holes (e.g., may not be through-holes). In such an embodiment, each of the holes 36a, 36b has a base (or bottom) similar to the base of the groove 30 as described above with reference to FIGS. 2 and 3. The length and dimensions of the positive connection portions 32a, 32b may be similar to those of the negative connection portions 31a, 31b, 31c, 31d.

SOME REFERENCE NUMERALS 10 battery pack
12 battery module
20 secondary battery cell
21 cap assembly
22 positive temperature coefficient fuse
23 negative terminal
24 isolator
25 positive terminal
27 case
28 positive current collector structure 29a, 29b negative current collector structure
30 groove
31a, 31b, 31c, 31d negative connection portion
32a, 32b positive connection portion
33 base
34 lateral surface
35 protrusion
36a, 36b hole
37 first press fit connection
38 second press fit connection
39a, 39b lateral surface section
40a, 40b, 40c, 40d subportions
41 spacer
300 electric vehicle
301 interconnects
310 electric motor

What is claimed is:

1. A battery module comprising:
a plurality of secondary battery cells, each of the secondary battery cells comprising an electrode assembly comprising a positive electrode, a negative electrode, and a separator interposed between the positive electrode and the negative electrode, a case accommodating the electrode assembly, a positive terminal electrically connected to the positive electrode, and a negative terminal electrically connected to the negative electrode;
a positive current collector interconnecting the positive terminals of at least some of the plurality of secondary battery cells; and
a negative current collector interconnecting the negative terminals of at least some of the plurality of secondary battery cells,
wherein the case of each of the plurality of secondary battery cells has a groove, and the groove is a part of the negative terminal,
wherein the negative current collector comprises a negative connection portion press-fit into the groove of the case of a first one of the plurality of secondary battery cells to electrically connect the negative current collector and the negative terminal of the first one of the plurality of secondary battery cells.

2. The battery module as claimed in claim 1, wherein the positive terminal of the first one of the plurality of secondary battery cells has a hole,
wherein the positive current collector comprises a positive connection portion in the hole to electrically connect the positive current collector and the positive terminal, and
wherein the positive connection portion and the hole are mechanically connected with each other by a second press fit connection.

3. The battery module as claim in claim 2, wherein the positive connection portion comprises a plurality of subportions, and
wherein, in a mounted state, the subportions are pressed together.

4. The battery module as claimed in claim 3, wherein the positive connection portion has an elongated shape and a non-monotonically varying cross section.

5. The battery module as claimed in claim 1, wherein the groove has a base and a lateral surface,
wherein the lateral surface has a protrusion,
wherein the protrusion mechanically fastens the negative connection portion within the groove.

6. The battery module as claimed in claim 5, wherein the negative connection portion and/or the groove is configured to plastically deform the negative connection portion upon insertion of the negative connection portion into the groove.

7. The battery module as claimed in claim 1, wherein the case of each of the plurality of secondary battery cells has a cylindrical shape, and wherein the groove and the negative terminal of the case extend along a circumference of the case.

8. The battery module as claimed in claim 1, wherein the negative current collector comprises a plurality of negative connection portions per each of the cases.

9. The battery module as claimed in claim 8, wherein at least some of the negative connection portions are arranged on opposite lateral surface sections of each of the corresponding case.

10. The battery module as claimed in claim 1, further comprising two negative current collectors, wherein each of the negative current collectors comprises a negative connection portion, and wherein the plurality of secondary battery cells is arranged between the two negative current collectors.

11. The battery module as claimed in claim 10, wherein the plurality of secondary battery cells is linearly arranged, and wherein each of the two negative current collectors extends in parallel to the linearly arranged secondary battery cells.

12. The battery module as claimed in claim 1, wherein the negative connection portion comprises a plurality of sub-portions, and wherein, in a mounted state, the subportions are pressed together.

13. The battery module as claimed in claim 1, wherein the negative connection portion has an elongated shape and a non-monotonically varying cross section.

14. The battery module as claimed in claim 1, wherein each of the positive terminals of the plurality of secondary battery cells has a plurality of holes, and wherein the positive current collector comprises a plurality of positive connection portions.

15. A battery pack comprising:

a plurality of the battery modules as claimed in claim 1; and an interconnect connecting the battery modules to each other.

16. An electric vehicle comprising the battery pack as claimed in claim 15.

* * * * *